March 1, 1966 MASAO INABA 3,238,463

SYNCHRONOUS DEMODULATOR CIRCUIT

Filed Sept. 16, 1963

INVENTOR:
MASAO INABA

BY Hopgood & Calimafde

ATTORNEYS

United States Patent Office
3,238,463
Patented Mar. 1, 1966

3,238,463

SYNCHRONOUS DEMODULATOR CIRCUIT

Masao Inaba, Tokyo, Japan, assignor to Nippon Electric Company Limited, Tokyo, Japan, a corporation of Japan Filed Sept. 16, 1963, Ser. No. 309,011
Claims priority, application Japan, Sept. 20, 1962, 37/41,474
7 Claims. (Cl. 329—50)

This invention relates to signal demodulating circuits which are suitable for the demodulation of amplitude and phase modulated carrier signals such as, for example, chrominance signals in NTSC system color television.

Conventionally, in the chrominance signal demodulation circuit in NTSC system color television receivers, there is employed a synchronous demodulating circuit for performing what is known as "product detection," in which a multielectrode vacuum tube having two control grids is used. Suitable for such operation is a vacuum tube of the suppressor-grid control type such as the pentode 6AS6. To the first control grid of this tube there is applied the amplitude and phase modulated carrier signal (i.e., the chrominance signal) and to the second control grid there is applied a reference carrier signal of predetermined phase; from the anode there is derived an output signal proportional to the amplitude of the carrier signal applied to the first control grid and also proportional to the cosine of the difference in phase between the carrier signal applied to the first control grid and the carrier signal applied to the second control grid. The principle of this "product detection" operation is based upon the fact that the anode current is proportional to the product of the potential variations on the first and second control grids, as a result of the potential variation on the second control grid controlling the rate of variation of the anode current due to the potential variation on the first control grid.

So far as vacuum tube circuits are concerned, product detection operation may be realized by using a tube of the 6AS6 type mentioned above, however, no transistor circuits suitable for this operation have heretofore been devised.

Accordingly, it is an object of this invention to provide a synchronous demodulating circuit which employs semiconductor elements rather than vacuum tubes.

A further object of the invention is to provide a synchronous demodulating circuit which is adapted to carry out multiplication of two sinusoidal signals and thereby perform product detection.

Figure 1:
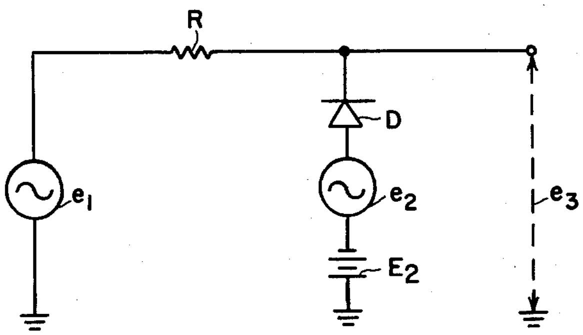
Figure 2:
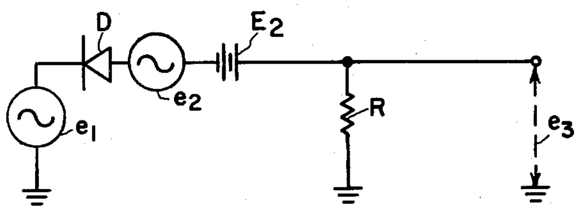
Figure 3:
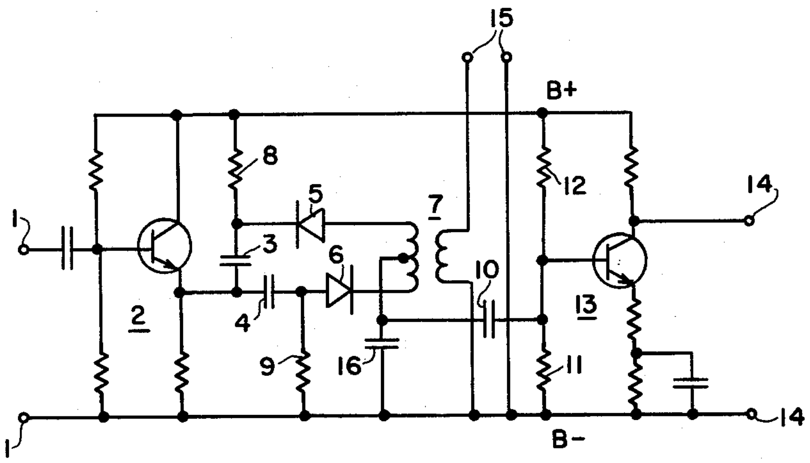

All of the objects, features and advantages of this invention and the manner of attaining them will become more apparent and the invention itself will be best understood by reference to the following description of an embodiment of the invention taken in conjunction with the accompanying drawings, in which FIG. 1 shows a basic form of the synchronous demodulating circuit in accordance with the invention, FIG. 2 shows a modified form of the circuit, and FIG. 3 shows a schematic wiring diagram of a color demodulation circuit employing the principles of this invention, and used in an NTSC type color television receiver.

Referring now to FIG. 1, $e_1$ indicates an electrical signal source representing the multiplicand, which may be a signal to be demodulated, and $e_2$ is an electrical signal source representing the multiplier. The battery $E_2$ is a suitable bias voltage source, R is a resistor having a relatively large resistance value, and D is a semiconductor diode preferably having the property that its resistance ($dV/dI$) changes gradually with the inverse voltage across it, and may be, for example, a Zener diode having a Zener voltage of approximately 5 volts. The signal voltage $e_1$ in the circuit shown in FIG. 1 is divided by the resistance of the series resistor R and diode D to produce an output voltage $e_3$. The voltage dividing ratio will of couse be influenced by the resistance of diode D changing with $e_2$. Now if it is assumed that the resistance $\gamma_d$ of the diode D varies approximately as $$\gamma_d = KV^\alpha \qquad (1)$$

(where $\alpha \neq 0$ and K=a constant)

in dependence upon the inverse voltage V, where $$V = E_2 + e_2 \qquad (2)$$

then the output voltage $e_3$ will be $$e_3 = e_1 \frac{KV^\alpha}{V + KV^\alpha} \qquad (3)$$

If $R >> KV^\alpha$ and $E_2 > /e_2/$, then we have $$e_3 = e_1 \frac{KV^\alpha}{R} = \frac{Ke_1^\alpha}{R}(E_2 + e_2)^\alpha \qquad (4)$$

$$= \frac{Ke_1}{R} E_2^\alpha \left(1 + \frac{e_2}{E_2}\right)$$

$$= \frac{Ke_1}{R} E_2^\alpha \left[1 + \frac{\alpha}{1!}\frac{e_2}{E_2} + \frac{\alpha(\alpha-1)}{2!}\left(\frac{e_2}{E_2}\right)^2 + \cdots\right] \qquad (5)$$

Since in the case of chrominance signal demodulators in NTSC type color television receivers the frequency of the carrier wave is approximately 3.6 mc. and the required frequency band is a maximum of 1.5 mc., it is possible that by providing a low pass filter having a bandwidth of less than 1.5 mc., all the terms beyond the third term in the above formula will have no substantial effect, so that it may be regarded as $$e_3 = \frac{Ke_1}{R}(E_2 + \alpha e_2) \qquad (6)$$

This represents $e_2$ and $e_1$ in the form of their product and it will now be appreciated that the circuit of FIG. 1 will perform a multiplying operation in the demodulation of a modulated wave such as the signal $e_1$. In the explanation set forth above, the coefficient $\alpha$ is not zero and it will be understood from Formula 4 that a multiplication free of higher order distortions will hold in the case of usual real numbers.

FIG. 2 shows another example in which the series impedance elements and parallel impedance elements in the circuit of FIG. 1 are interchanged. The output voltage $e_3$ in this case is $$e_3 = \frac{R}{KV^\alpha + R} e_1 \qquad (7)$$

If $KV^\alpha >> R$, the above expression may be written as $$e_3 = \frac{Re_1}{KV^\alpha} = \frac{Re_1}{KE_2^\alpha\left(1 + \frac{e_2}{E_2}\right)^\alpha}$$

$$= \frac{Re_2}{KE_2^\alpha}\left\{1 - \frac{\alpha e_2}{E_2} + \frac{\alpha(\alpha+1)}{2}\left(\frac{e_2}{E_2}\right)^2 \cdots\right\} \qquad (8)$$

The form of expression (8), like expression (5), shows that $e_3$ includes the product of $e_1$ and $e_2$ and a multiplication free of higher order distortions can be obtained when $\alpha = -1$.

From the above description, it will be seen that when a first signal is applied to the series circuit of a first impedance element and a second impedance element whose impedances vary with a second signal, the potential produced across either one of the impedance elements will be represented by the form of the product of the first and second signals. However, the impedance element which is to be controlled by the second signal need not necessarily be a Zener diode but may be any other suitable type semiconductor diode as well. For example, diodes which exhibit a change in equivalent capacitance with changes in the bias voltage applied thereto (so-called varicaps), or non-linear elements such as varistors, may be employed.

FIG. 3 shows an example of the synchronous demodulating circuit of the invention employed in the chrominance demodulation circuit of an NTSC type color television receiver. In FIG. 3, the numeral 1 indicates input terminals to which are applied a first signal, which is the chrominance signal to be demodulated, numeral 2 indicates an emitter follower type amplifier for impedance conversion, and numerals 3 and 4 denote coupling condensers for connecting the signal from the emitter of the amplifier 2 to the multiplying circuit. Numerals 5 and 6 denote diodes of the same type indicated by the letter D in FIG. 1, i.e., low voltage Zener diodes, numeral 7 indicates a transformer for applying the second signal to the diodes 5 and 6 for multiplication, numerals 8 and 9 denote bias resistors for setting the diodes 5 and 6 at suitable operating points, and numeral 10 indicates a coupling condenser for connecting the signal to the combined load resistance comprising load resistors 11 and 12 and isolating it from the bias on diodes 5 and 6. Numeral 13 indicates an emitter grounded transistor amplifier, numeral 14 indicates output terminals for the demodulated signal, and numeral 15 indicates terminals to which are applied the second signal, which is a reference carrier signal having a predetermined phase with respect to the first signal, to provide demodulation. Numeral 16 is a condenser inserted to cancel the influence of the barrier capacity of the Zener diodes 5 and 6.

The part of the circuit in FIG. 3 of primary concern here comprises the variable impedance series element made up of the diodes 5 and 6, and the fixed impedance parallel element made up of the combined resistors 11 and 12. Its operation is, in principle, the same as that set forth in connection with FIGS. 1 and 2. The first signal, i.e. the signal applied to the input terminals 1 comprises a carrier signal which is both amplitude and phase modulated and the second signal applied to the input terminals 15, is as already noted, a reference carrier signal. During operation the impedance of the diodes varies as a logarithmic or power function as a result of the second signal variations applied thereto. The output signal at the terminals 14 is substantially proportional to the product of the first and second signals.

Now let it be assumed that the chrominance signal E$c$ coming to the input terminals 1 is $$\acute{E}c=Ec\sin(wt+\theta)$$

and the voltage applied to the diodes is $$Ec+Er\sin wt$$

where $E_2$=amplitude of color subcarrier,
$w$=angular frequency of color subcarrier, and
$\theta$=phase of color subcarrier corersponding to the hue of the original scene.

It follows from the aforesaid theory that the output signal E$o$ at the terminals 14 will be $$E_o=E_c\sin(wt+\theta)\cdot Er\sin wt$$

$$=\frac{EcEr}{2}\cos\theta-\frac{EcEr}{2}\cos(2wt+\theta) \quad (10)$$

If the frequencies above $2w$ are caused to be filtered out, the second term in the above formula will be removed leaving the first term alone so that an output proportional to $Ec\cos\theta$ may be obtained. Thus, by proper choice of the subcarrier or signal applied to the terminals 15 the desired color demodulation is achieved. This signal is characterized by the phase of the signal applied to the terminal 15, so that if $\acute{E}r$ has a phase of 33°, the output signal at the terminals 14 may be obtained as the $\theta$ signal, specified in the NTSC signal specification.

Although the present invention has been described with reference to specific drawings, it will be understood that the essentials thereof comprise circuit arrangements such that a first signal is applied to a series connection of certain impedance elements, and by controlling the impedance value of at least one of these elements by a second signal, an output signal proportional to the product of the first and second signals is obtained across either of the impedance elements. As previously indicated, in the special case where $\alpha=1$ (or $\alpha=-1$) in Formula 2 above, an ideal multiplication which is clear of higher order distortions may be obtained and, consequently, it is useful not only for the multiplication of modulated signals but also for the construction of a multiplying circuit for general analog quantities.

While the foregoing description sets forth the principles of the invention in connection with specific apparatus, it is to be understod that the description is made only by way of example and not as a limitation of the scope of the invention as set forth in the object thereof and in the accompanying claims.

What is claimed is:

1. A demodulating circuit comprising a series circuit of at least two impedance elements, means for applying a first signal across said series circuit, said first signal being a modulated carrier signal, means for applying a second signal to at least one of said series connected impedance elements to cause the impedance thereof to vary in a non-linear manner, and means for deriving from across one of said series connected impedance elements a signal voltage, said signal voltage being substantially proportional to the product of said first and second signals.

2. The invention described in claim 1 wherein at least one of said impedance elements comprises a Zener diode.

3. A demodulating circuit comprising an impedance element and a diode element connected in series between a pair of input terminals, means for applying a first signal across said input terminals, said first signal being a carrier signal which is amplitude and phase modulated, means for applying a second signal to said diode to cause the impedance thereof to vary in a non-linear manner, and means for driving from across one of said elements a signal voltage, said signal voltage being substantially proportional to the product of said first and second signals.

4. A demodulating circuit compriisng a first and second electrical connection and a pair of semiconductor diodes, the cathode of one of said diodes being connected to said first electrical connection and the anode of the other of said diodes being connected to said second electrical connection, a transformer having a tapped secondary winding, said winding being connected between said diodes to thereby form a series circuit with said diodes between said first and second electrical connections, a load impedance coupled to said secondary tap, a capacitor connected to said secondary tap to cancel the influence of the barrier capacitance of said diodes, means for applying a first signal between said first and second electrical connections, said first signal being a carrier signal that is both amplitude and phase modulated, and means for coupling a second signal to the primary of said transformer to thereby effect variations in the impedance of said diodes in accordance with the variations of said second signal, said second signal having a predetermined phase relative to said first signal, whereby an output signal substantially proportional to the product of the first and second signal values is produced at said load impedance.

5. The invention described in claim 4 wherein each of said diodes is of the Zener type.

6. The invention described in claim 5 which further includes means for biasing each of said diodes to a predetermine operating point.

7. A demodulating circuit comprising a first and second electrical connection and a pair of semiconductor diodes, the cathode of one of said diodes being connected to said first electrical connection and the anode of the other of said diodes being connected to said second electrical connection, a transformer having a tapped secondary winding, said winding being conected between said diodes to thereby form a series circuit with said diodes between said first and second electrical connections, a load impedance coupled through a capacitor to said secondary tap, means for coupling a first signal to each of said first and second electrical connections, said first signal being a modulated carrier signal, and means for coupling a second signal to the primary of said transformer to thereby effect variations in the impedance of said diodes in accordance with the variations of said second signal, whereby an output signal substantially proportional to the product of the first and second signal values is produced at said load impedance.

References Cited by the Examiner

UNITED STATES PATENTS

| | | | |
|---|---|---|---|
| 2,827,611 | 3/1958 | Beck | 329—154 X |
| 3,013,161 | 12/1961 | Garreta | 307—88.5 |
| 3,130,323 | 4/1964 | Swain | 328—160 X |

ROY LAKE, *Primary Examiner.*

ALFRED L. BRODY, *Examiner.*